J. C. HENDERSON.

Coal Stove.

No. 3,523. Reissued June 29, 1869.

Witnesses

Charles D. Kellum

R. D. Reilly

Inventor

J. C. Henderson

N. PETERS, Photo-Lithographer, Washington, D. C.

UNITED STATES PATENT OFFICE.

JOSEPH C. HENDERSON, OF ALBANY, NEW YORK.

IMPROVEMENT IN COAL-STOVES.

Specification forming part of Letters Patent No. 28,482, dated May 29, 1860; reissue No. 1,506, dated June 30, 1863; reissue No. 2,459, dated January 15, 1867; reissue No. 3,523, dated June 29, 1869.

*To all whom it may concern:*

Be it known that I, JOSEPH C. HENDERSON, of the city and county of Albany and State of New York, have invented a new and useful Improvement in Base-Burning Stoves; and I do hereby declare that the above is a full and exact description of that part of my said invention relating to heating-stoves, heaters, furnaces, &c., reference being had to the accompanying drawings, and to the letters of reference and figures marked thereon as constituting a part of this my specification.

Figure 1:
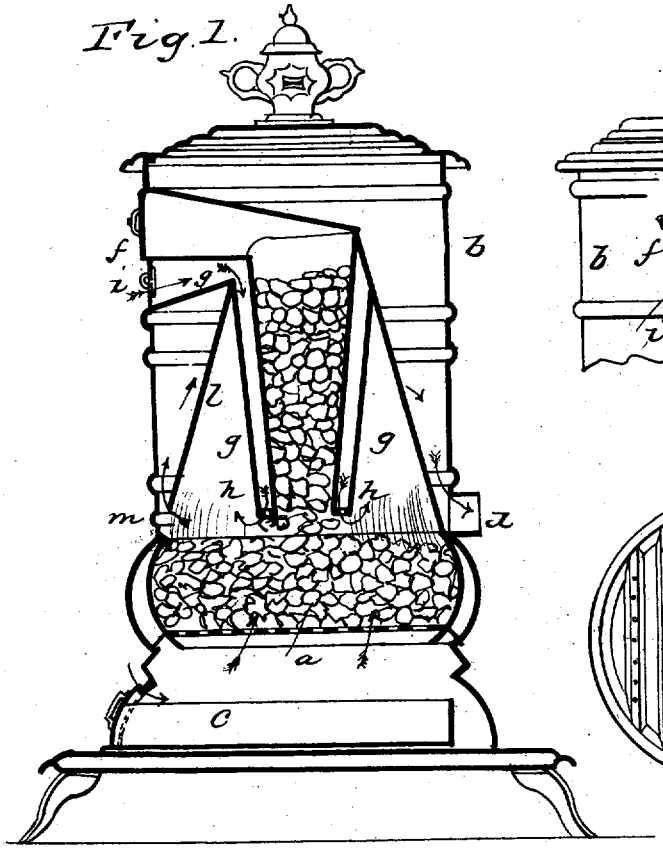
Figure 2:
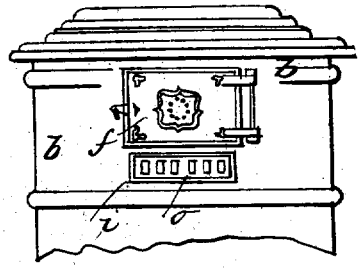
Figure 3:
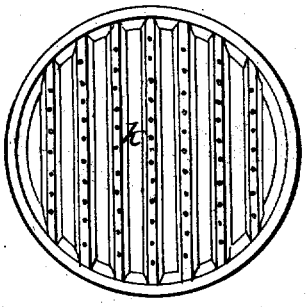

In the accompanying drawings, Figure 1 represents a vertical section of my improved stove. Fig. 2 represents a front elevation of the same, or of a portion thereof. Fig. 3 represents a plan of the grate.

In each figure like letters represent like parts.

Stoves have heretofore been constructed in which the fuel has been placed in a hopper or reservoir over the fire and above the grate, for the purpose of supplying to the fire fresh coal as fast as consumption takes place on the grate.

There are many advantages attending this method of supplying fuel to a coal-fire, among which may be particularly noticed the following: First, the deadening of the fire by putting on a fresh supply of coal at a low temperature is avoided, and an even and uniform combustion of the fuel is promoted, thereby guarding against a low temperature, permitting the gases to escape unconsumed at one moment, and a too rapid consumption of the coal when the mass becomes ignited, requiring constant attention to prevent the fire from burning out the fuel, and then dying out; but hitherto two principal difficulties have attended this method of supplying fuel to the fire, and it is the principal object of my improvement to remedy them. First, the fuel within the hopper is liable to ignite, owing to the great heat surrounding the lower part of the same; and, second, the gases generated pass off without being consumed, because not brought in contact with the surface of burning solid fuel.

The nature of my said invention consists in suspending a hopper above the fire-pot to receive and supply coal constantly to the surface of the fire in a condition to ignite freely, and over the surface of the fire and around the mouth or lower part of the hopper to construct an expanded combustion-chamber for receiving the gases eliminated, and detaining them in contact with the surface of the incandescent coals until consumed.

To prevent ignition within the hopper, I cause a current of air to circulate in a chamber formed around the lower part and mouth of the hopper, as shown in Fig. 1 of the annexed drawings. I also design this circulating current of air to protect the mouth of the hopper by keeping it cool, and also to assist in the combustion of the fuel by supplying a blast of hot or warm air to the surface of the incandescent coal and among the unconsumed gases.

By confining the gases by means of my combustion-chamber to the space at and immediately above the surface of the incandescent coals, and by supplying that surface with a current of air, I am enabled to effect very perfect combustion.

I will now proceed to describe in detail the several parts of my said invention.

In the drawing, Fig. 1, *a* is the fire-pot. *b* is the casing or plates of the stove. *c* is the ash-drawer. *d* is the escape or smoke pipe. *e* is a hopper, into which the fuel is first introduced. *f* is the supply-door. *g* is an air space or chamber between the hopper and the chamber, containing the escaping products of combustion, terminating at the openings *h h;* and *i* is a register to admit air to the air-chamber *g*, as shown in said drawings.

In the accompanying drawings I have represented my hopper as round and conical, and as being directly over the center of the grate *k;* but I do not purpose to confine myself to the precise shape or location of the hopper, as represented in said drawing, where the shape and character of the stove to which they are applied requires deviation in that respect; but in whatever construction of stove my improvement is to be applied, the air-chamber *g*, or its equivalent, and the expanded or conical combustion-chamber *l*, above the surface of the incadescent coal and around the lower end of the hopper, must be preserved, for the purposes already described.

The cone *f* is introduced around my hopper for the purpose of limiting the extent of my chamber *l*, formed about the mouth or lower end of my hopper, having the outlet therefrom at or near the surface of the incandescent coal, for the purpose of aiding in bringing the gases in contact with the surface of the fire to effect more perfect combustion.

If, in the construction and application of my improvements to heating and other stoves, it should be thought desirable to substitute fire-brick in the place or stead of my air-space *g*, that may be done by filling the lower portion of the said air-chamber, between the hopper and the cylinder surrounding it, with fire-brick resting upon the flanges of the lower end of the hopper and cylinder shown in the drawings, and the operation of the stove be substantially preserved, as herein represented, by admitting air within the expanded chamber *l*, above and upon the surface of the fire, by openings in suitable places for that purpose. In such construction the fire-brick would perform the office of my chamber *g*, so far as protecting the fuel within the hopper from combustion and preserving the mouth of the hopper, and the admission of air to the surface of the fire from other suitable openings in the chamber would promote the combustion of the fuel and gases.

Having thus fully and clearly described my said invention and improvement, I will set forth my claims:

1. A hopper or reservoir for supplying coal suspended over a fire pot or grate, larger at the upper than at the lower end of the same, and detached from the fire-pot, substantially in the manner and for the purpose above described.

2. An expanded combustion-chamber directly over the surface of the incandescent coal in the fire-pot and surrounding the mouth or lower end of the hopper, substantially in the manner and for the purpose above described.

3. The use of inclined plates *f* in combination with a combustion-chamber formed above the surface of the incandescent coal and around the mouth of the hopper, to reflect and throw back the heat and gases upon the surface of the fire, substantially in the manner and for the purposes above described.

4. The contracted outlet *m*, in combination with said expanded chamber, so arranged that the escaping products of combustion shall pass out at or near the surface of the incandescent coal, substantially in the manner and for the purpose above described.

5. In combination with a hopper suspended over the fire and separate from the fire-pot, a circulating current of air around the lower end of the hopper, substantially in the manner and for the purposes above described.

6. In combination with the above-described hopper, a chamber or its equivalent in the lower end of the same and immediately above the fire, for the purpose of preserving the mouth of the hopper and supplying air to the surface of the fire, substantially as above described.

7. The circulation of a current of air around the lower end or mouth of a supply-cylinder and entering the combustion-chamber, substantially in the manner and for the purpose above described.

8. The use of fire-brick, soap-stone, or other similar fire-proof substances in protecting the mouth or lower end of the hopper, in combination with my expanded combustion-chamber *l* and air-chamber *g*, substantially in the manner and for the purposes above described.

9. The admission of air to the surface of the burning fuel in the bottom of my combustion-chamber *l*, above described, in combination with the use of fire-brick or other similar material to protect the mouth of the hopper, substantially in the manner and for the purpose above described.

10. The combination of the expanded chamber at the base of the hopper with draft from said chamber, substantially in the manner and for the purpose above described.

11. A current of air circulated around or in contact with the lower part of the said hopper in combination with the expanded combustion-chamber at the base of the hopper, substantially in the manner and for the purpose above described.

JOSEPH C. HENDERSON.

In presence of—
JOEL TIFFANY,
DAVID KETCHAM.